United States Patent [19]

Carita

[11] 3,712,537

[45] Jan. 23, 1973

[54] CIRCUIT FOR DIAGNOSING FAILURES IN ELECTRONIC MEMORIES

[75] Inventor: Enrico Carita, Turin Corso Dante, Italy

[73] Assignee: Honeywell Information Systems Italia, Caluso, Italy

[22] Filed: Dec. 22, 1970

[21] Appl. No.: 100,635

[30] Foreign Application Priority Data

Dec. 30, 1969 Italy..............................26421 A/69

[52] U.S. Cl. ............................235/153, 340/174 ED

[51] Int. Cl. .............................................G11c 29/00

[58] Field of Search.....235/153; 340/146.1, 174 ED, 340/166 R, 166 C

[56] References Cited

UNITED STATES PATENTS

| | | | |
|---|---|---|---|
| 3,196,418 | 7/1965 | Schneberger et al. | 340/174 ED |
| 3,411,137 | 11/1968 | Howells et al. | 340/146.1 |
| 3,460,092 | 8/1969 | Davidson et al. | 340/174 ED |

*Primary Examiner*—Charles E. Atkinson
*Attorney*—Fred Jacob, Ronald T. Reiling and Lewis P. Elbinger

[57] ABSTRACT

Apparatus for detecting and locating faults in the selection circuits of addressable memories, wherein the memory line selection switches are closed according to a predetermined order and sequence, and wherein the pattern of current flow through said switches during said sequence is recorded, the recorded pattern of current flow providing an indication of the presence and location of faults.

10 Claims, 6 Drawing Figures

Enrico CARITA' INVENTOR.

BY

ATTORNEY

Enrico CARITA' INVENTOR.

BY

[signature]

ATTORNEY

Enrico CARITA'
INVENTOR
BY
ATTORNEY

PATENTED JAN 23 1973 3,712,537

SHEET 4 OF 5

Enrico CARITA'
INVENTOR.

BY [signature]

ATTORNEY

Enrico CARITA
INVENTOR.

BY

ATTORNEY

CIRCUIT FOR DIAGNOSING FAILURES IN ELECTRONIC MEMORIES

BACKGROUND OF THE INVENTION

This invention relates to a circuit for detecting and locating certain types of faults in the driving circuits of electronic memories used in data processing equipment.

The problem of diagnosing faults in electronic computers exhibits unique characteristics in the instance of memory devices. This problem is particularly significant because of the importance of these devices in the operation of the computer, and because of the construction and operational characteristics of such devices.

For diagnosing faults in most circuits provided in an electronic computer, primarily logical methods based on the use of diagnostic programs may be employed. However, these methods are generally unsatisfactory when applied to memory devices. The circuits for controlling the input, output and addressing of a memory have particular characteristics, which differ from those of the usual logical circuits in the other parts of a computer. Therefore, although the diagnosis of faults carried out by logical methods may detect the presence of malfunctioning inside the interface separating the circuits of the memory proper from the logical circuits, generally such methods cannot determine the actual location of a fault.

Particularly in the case of magnetic memory devices, as for instance magnetic core memories, writing and reading of data in the memory elements are effected by the use of currents of considerable intensity, having predetermined directions, and flowing through memory lines individually selected from among a set of lines.

The selection of a particular memory line is effected by closing two switches, which thereby complete a circuit comprising a voltage source, a current driver, a first switch, the selected line, a second switch and a main return conductor. The switches interposed between the current driver and one terminal of each memory line will be called "source" switches herein, whereas those located between the opposite line terminals and the main return conductor will be called "-sink" switches. The selection of a line takes place by the simultaneous closure of a source switch and a sink switch.

It is known that in most of the memory systems in use each memory line must permit the flow of current pulses in opposite directions, according to whether a "-write" or a "read" operation is initiated. To prevent the return of these currents along improper paths, the lines are provided, either at one or at both terminals, thereof, with pairs of oppositely poled diodes.

As a consequence of the reading operations, a set of output signals on output lines is obtained, these signals depending on the state of the memory elements affected by the reading pulses.

The methods used in the prior art to detect and, if possible, to locate memory faults are based on logical procedures. These logical procedures consist of loading the memory with a suitable pattern of information, then proceeding to read the contents of the memory, checking whether the signals obtained at the output are the same as required for correct operation. If this is not the case, a search is made in order to establish which defective components may have originated the resulting defective output. This approach may be refined and improved in different ways, as by acting directly on some switches to operate or inhibit them in order to obtain suitable partitions of the memory field and to gain information about the zone of the memory which contains the fault.

It is known that in implementing the aforementioned source and sink switches transistors are usually used. These transistors are subject to especially severe conditions, as they must withstand direct currents and inverse voltages appreciably higher than those used with logical circuits, and, in addition, must operate at high speed. It has been experimentally established that most of the operation failures in memory circuits are caused by faults in the transistors operating as switches, such faults consisting of these switches remaining closed when they should be open. This results in a faulty distribution of the currents in the memory lines, whereby these currents, for instance, are subdivided into a plurality of parallel paths. The measure of such subdivision is wholly unpredictable since it may vary with the time, the temperature, and other accidental factors. Therefore the pattern of the output signals is variable and unpredictable, and the location of the fault by means of logical diagnostic methods is precluded. This may also occur if one or more diodes connected to the line terminals become short-circuited, since, similarly in this instance, spurious paths, in parallel with the correct path, are possible.

On the other hand, a fault consisting of a permanent open state of a switch, or of the isolation of a diode, has as a consequence the preventing of the flow of the current in the affected lines, and is easily diagnosed by the usual methods.

Therefore, it is an object of the present invention to provide a device for checking the correct operation and the integrity of the components of a memory circuit, and particularly of switches and diodes thereof, in a manner to locate a switch which is constantly closed, short-circuited diode, or at the least, a group of switches or of diodes comprising a faulty switch or diode.

SUMMARY OF THE INVENTION

This object is achieved by providing a circuit arrangement and diagnostic program for inhibiting the closing of all source switches while closing in succession all sink switches, and then for inhibiting the closing of all sink switches while closing in succession all source switches. A threshold device is provided for detecting the flow of current through each switch which is closed at each time. An error register records the error signals generated by such current flows. The flow of the current upon the closing of a sink switch or a source switch, when correspondingly the closure of all source switches or sink switches is inhibited, demonstrates that at least one of the inhibited switches is improperly closed inasmuch as it permits current to flow.

Employing a different diagnostic program, which maintains a particular source switch closed, and closes in succession each sink switch located on the same side of the memory lines of the closed source switch, the short-circuiting of one or more diodes connected to the memory lines may be detected.

When execution of the diagnostic programs has been completed, it is possible, by examination of the pattern of error signals stored in the error registers, to identify defective switches or diodes or, at least, to identify a subset of diodes or switches which includes a defective diode or switch.

BRIEF DESCRIPTION OF THE DRAWING

This invention will be described with reference to the accompanying drawing, wherein.

DESCRIPTION OF THE PREFERRED EMBODIMENT

Figure 1:
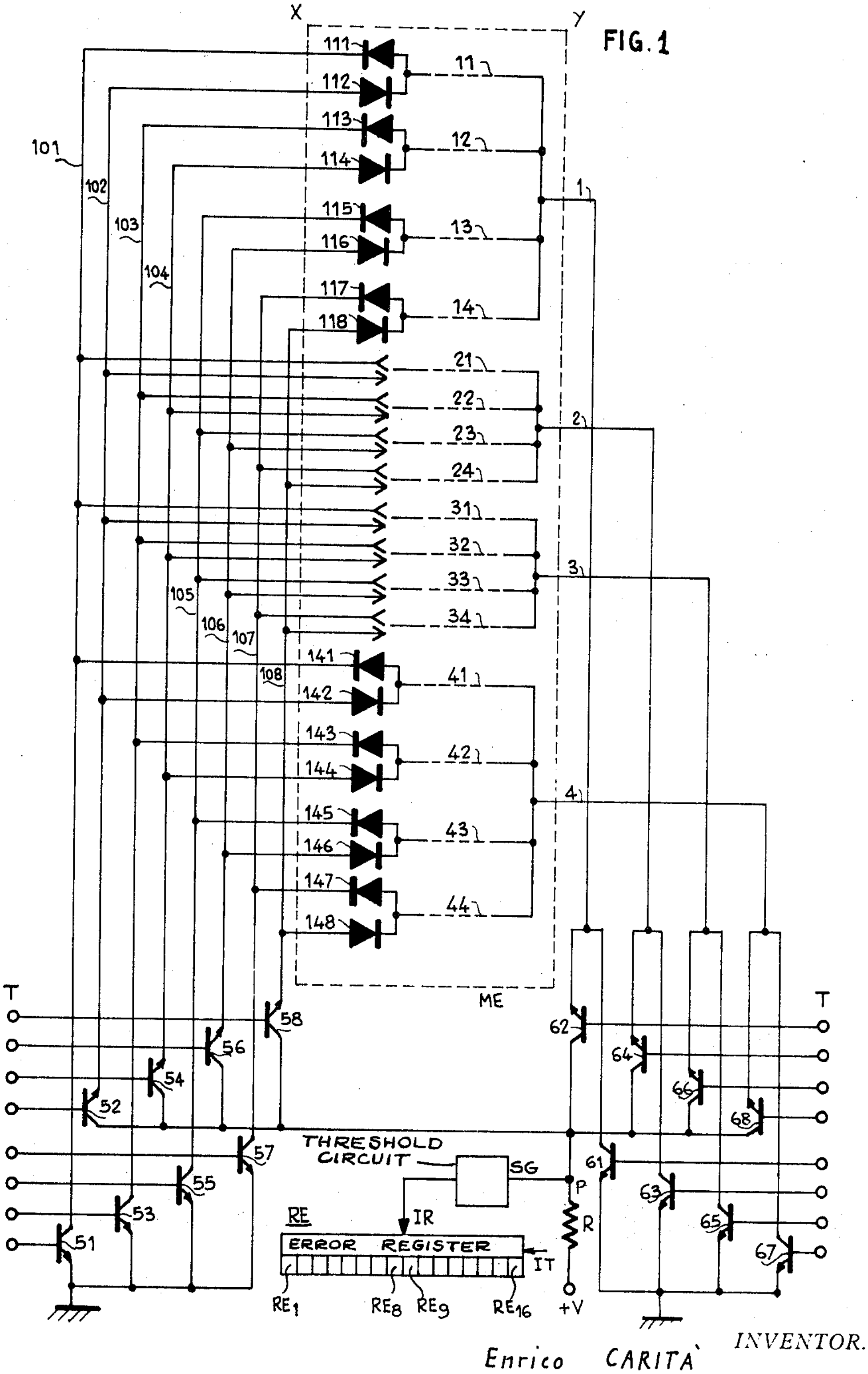
FIG. 1 is a schematic diagram showing the lines of a dimension of selection of a memory matrix having two diodes per line, and illustrating testing circuits in accordance with the invention.

In FIG. 1, the 16 lines of a dimension of selection of a memory are shown schematically and in part. The 16 lines are subdivided in four groups of four lines each. The lines of the first group are designated by the respective reference numerals 11 to 14. Reference numerals 21 to 24 designate respective lines of the second group; 31 to 34 respective lines of the third group, and 41 to 44 respective lines of the fourth group. Each line is provided at one of the terminals thereof with two oppositely poled diodes. These diodes are shown only for the first and fourth groups in the drawing, being designated by the respective reference numerals 111 to 118 and 141 to 148.

Therefore, each memory line is connected, at its diode terminal, to two output leads, in each of which the current may flow only in a predetermined direction. The diodes of the second and third line groups are not shown, in their place there being provided arrows showing the direction in which the corresponding diodes permit current to flow.

The other terminal of the four lines in each group is connected to a common lead. These common leads are designated by the respective reference numerals 1,2,3 and 4 for the first, second, third and fourth groups.

The left side of the line arrangement shown in FIG. 1 is indicated by the letter X and the right side by the letter Y. On the Y side each of leads 1,2,3 and 4 is connected to a respective pair of NPN transistors; these transistors being designated by the respective reference numerals 61 and 62; 63 and 64; 65 and 66; and 67 and 68. Transistors 62,64,66 and 68 operate as source switches and, therefore, have their collectors connected to a positive voltage source +V through a common resistor R. The emitters of transistors 62,64,66 and 68 are connected to respective leads 1,2,3 and 4. Transistors 61,63,65 and 67 operate as sink switches and, therefore, have their emitters connected to a common ground conductor. The collectors of transistors 61,63,65 and 67 are connected to respective leads 1,2,3 and 4. The bases of the four source switches and of the four sink switches on the Y side are connected respectively to as many terminals T, at which the control signals for opening and closing the respective switches are received. Each transistorized switch may comprise an amplifier circuit, not shown, interposed between the corresponding terminal T and the base of the respective transistor.

On the X side all of the first diodes (such as diodes 111 and 141) of each diode pair connected to the first line 11,21,31 and 41 of all groups of memory lines are connected through a lead 101 to the collector of a transistor 51. Transistor 51 operates as a sink switch, having a grounded emitter. All of the second diodes (such as diodes 112 and 142) connected to these first memory lines are connected through a lead 102 to the emitter of a transistor 52. Transistor 52 operates as a source switch, having a collector supplied from the voltage source +V through resistor R.

Similarly, diodes such as diodes 113 and 143 of the second memory line 12, 22, 32, 42 of all groups are connected through a lead 103 to the collector of a transistor 53, which has a grounded emitter. Diodes such as diodes 114 and 144 of the second lines are connected through a lead 104 to the emitter of a transistor 54, whose collector is supplied through resistor R from the voltage source +V. Diodes such as diodes 115 and 145 of the third line 13, 23, 33, 43 of all groups are connected through a lead 105 to the collector of a transistor 55, whose emitter is grounded. Diodes such as diodes 116 and 146 are connected through a lead 106 to the emitter of a transistor 56, whose collector is supplied from voltage source +V through the limiting resistor R. The diodes such as diodes 117 and 147 of the fourth line 13,24,34, and 44 of all groups are connected through a lead 107 to the collector of a transistor 57, which has a grounded emitter. Diodes such as diodes 118 and 148 of the fourth lines of all groups are connected through a lead 108 to the emitter of a transitor 58, having a collector supplied from voltage source +V through resistor R.

The bases of the four source switches and of the four sink switches on the X side are connected respectively to as many terminals T, at which the control signals for opening and closing the respective switches, sometimes through the intermediary of amplifying circuits, are received.

The resistor R, connected at one terminal thereof to the voltage source +V, operates as a constant current generator. Resistor R increasingly approximates an ideal current generator as its resistance value is increased relative to the resistance value of the load. However, resistor R may be replaced with a suitable circuit operating more satisfactorily as a constant current generator.

A threshold circuit SG has its input lead connected to the junction point P between resistor R and the collectors of all transistors operating as source switches. Each time a line is selected; i.e., each time a current pulse flows through a circuit completed by the closing of a source switch and a sink switch, there is a voltage drop of point P with respect to the source +V. This voltage drop is detected by threshold circuit SG, which in response thereto delivers a binary ONE signal on its output lead. The threshold circuit is adjusted so as to generate the binary ONE signal only if the circuit through the line is actually completed, but not in the instance of a transient or spurious pulse due to the closing of a single switch. The output lead of threshold circuit SG is connected to an input terminal IR of an error register RE. It will be assumed for clarity that register RE is arranged so that the signal on input lead IR is stepped along, under control of a clock signal applied to an input lead IT, to store the binary values present on input lead IR in successive memory cells $Re_1$ to $RE_{16}$. This arrangement may be suitably replaced by a shift register, with the same final result.

The test cycle for detecting if a switch is permanently closed comprises the following operations executed by suitable diagnostic programs:

1. All sink switches are closed, one at a time, in succession, while the closing of all source switches is inhibited. Synchronously with the closing of each sink switch, the output of threshold circuit SG is coupled successively to memory cells $RE_1$ to $RE_8$. If all source switches are open, no current pulse occurs, threshold circuit SG does not deliver any binary ONE signal, and the contents of each of cells $RE_1$ to $RE_8$ remains a binary ZERO. Assume, now, that one of the source switches on the X side is permanently closed, for example the switch embodied by transistor 52. Therefore, transistor 52 continuously supplies a voltage through lead 102 and the set of diodes which includes diodes 112 and 142 to all of the lines of all the groups. Each subsequent closure of one of sink switches 51,53,55 and 57 and 61,63,65 and 67 completes a circuit between the voltage source +V and the ground conductor, permitting the flow of current. Therefore, threshold circuit SG always delivers a binary ONE signal, and in each one of memory cells $RE_1$ to $RE_8$ a binary ONE is stored. This condition also occurs if any other of the X side source switches (54,56 or 58) is permanently closed.

If, on the other hand, the permanently closed source switch is on the Y side, as, for example, transistor 62, a voltage is supplied only to lines 11,12,13 and 14 of the first group. Therefore, there will be a flow of current corresponding to the closing of each of sink switches 51,53,55 and 57 on the X side and on the single sink switch 61 on Y side. Thus, a binary ONE will be stored in the four memory cells $RE_1$ to $RE_4$ and, in the case considered, in cell $RE_5$. If one of switches 64,66 or 68 is permanently closed there will be stored a binary ONE in the first four cells $RE_1$ to $RE_4$ and in a respective one of cells $RE_6$, $RE_7$, or $RE_8$.

It is apparent that this particular testing program permits determining whether there is a source switch permanently closed, and either locating it, if it is on the Y side, or simply establishing that it pertains to the group of source switches on the X side.

2. The closing of all sink switches is inhibited, and all source switches are closed, one at a time, in succession. If all sink switches are open, no current pulse occurs, and the cells $RE_9$ to $RE_{16}$ will store only binary ZERO. Assume, now, that a sink switch, for instance switch 51 on the X side, is permanently closed. Such a condition connects to ground, through lead 101 and the set of diodes which include diodes 111 and 141, all of the lines of all the groups. Therefore, there will be a flow of current in correspondence with the closing of each of source switches 52, 54, 56 and 58 and 62,64,66 and 68. Accordingly, each of cells $RE_9$ to $RE_{16}$ will store a binary ONE.

On the other hand, if the permanently closed switch is a sink switch on the Y side, for example switch 61, only lines 11, 12, 13 and 14 of the first group are connected permanently to ground. Consequently, there will be a flow of current in correspondence with the closing of each of source switches 52, 54 56 and 58 on the X side and of the single source switch 62 on the Y side. Thus, a binary ONE will be stored in the four cells $RE_9$ to $RE_{12}$ and in the cell $RE_{13}$. If the permanently closed switch comprises either transistor 63,65 or 67 there will be a binary ONE stored in a respective one of cells $RE_{14}$, $RE_{15}$ or $RE_{16}$.

This test permits determining whether there is a permanently closed sink switch, and either locating it, if it is on the Y side, or simply establishing that it is on the X side, without locating it.

3. If none of the switches is faulty, and, therefore, no binary ONE has been stored, the efficiency of the diodes now may be tested by inhibiting the closing of the sink and source switches on the X side and by closing both switches of all possible pairs comprising a sink switch and a source switch on the Y side. First, source switch 62 is maintained closed as all sink switches 61,63,65, and 67 are closed in succession. The binary ONE signals which may be generated by the threshold circuit are stored in cells $RE_1$ to $RE_4$. Then, switch 62 is opened and source switch 64 is closed as sink switches 61,63,65 and 67 are once again sequentially closed. The binary results are stored in cells $RE_5$ to $RE_8$. The operation is repeated for source 66 6 and finally for source switch 68, storing the binary results respectively in cells $RE_9$ to $RE_{12}$ and $RE_{13}$ to $RE_{16}$.

If all diodes are intact, a flow of current is possible only when closing the sink switch which is directly connected to the source switch which is being maintained closed. For example, when source switch 62 is maintained closed, there will be a flow of current only during the closure of switch 61; whereas when switch 64 is closed, current flow is possible only by closure of switch 63; and when switches 66 and 68 are closed, current will flow only by closure of respective switches 65 and 67. A binary ONE will be stored only in cells $RE_1$, $RE_6$, $RE_{11}$, and $RE_{16}$.

On the other hand, if, for example, one of diodes 112, 114, 116 or 118 is short-circuited, the closing of switch 62 supplies a voltage through such short-circuited diode to all lines of the remaining groups so that current will flow also by the closing of sink switches 63,65, and 67. For example, a binary ONE will be also stored in cells $RE_2$, $RE_3$ and $RE_4$. If one of diodes 111, 113, 115 or 117 is short-circuited, upon the closing of one of switches 64,66 or 68, a voltage will be supplied to all lines of the first group, and current will flow each time sink switch 61 is closed. Thus, a binary ONE will be stored in cells $RE_5$, $RE_9$ and $RE_{13}$. A similar error pattern is developed if corresponding diodes of the other line groups are short-circuited. It is thus possible to determine the group of lines comprising the faulty diode, and, in addition, to establish whether the faulty diode is polarized in the X–Y direction.

Figure 2A:
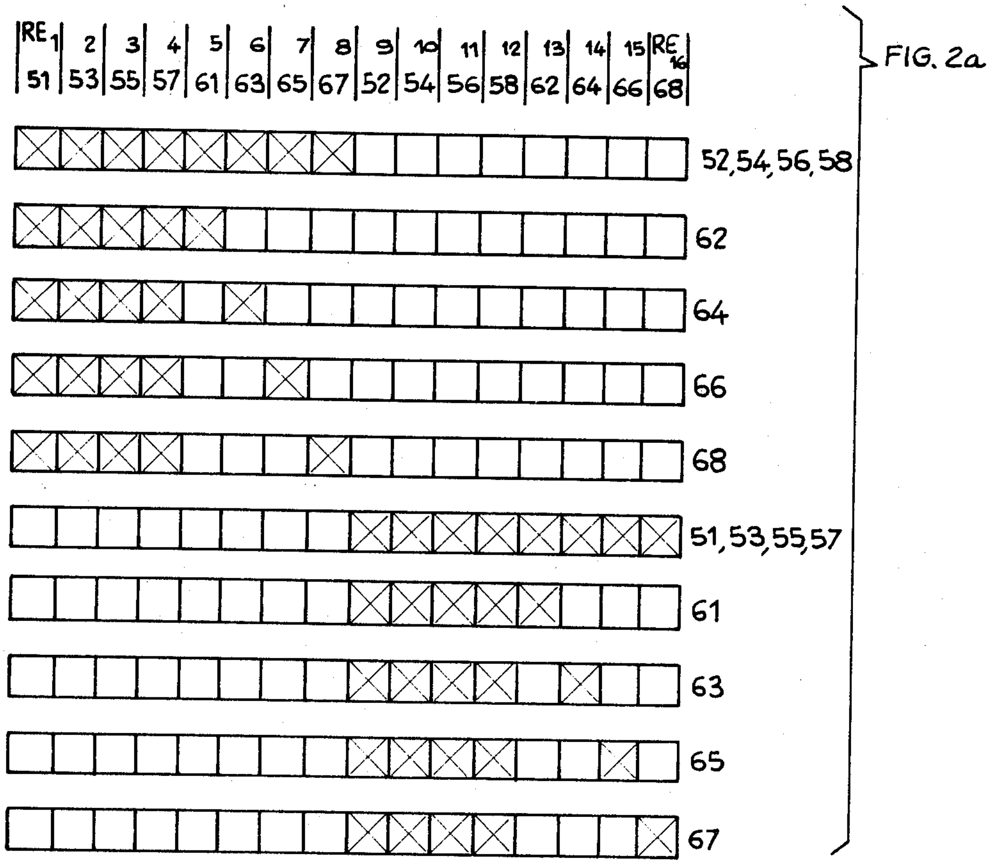
FIGS. 2*a* and 2*b* show the pattern of binary signals stored in the error register for faults in a transistor or a diode.

FIG. 2*a* shows the patterns of binary values stored in error register RE at the end of the operations which test the efficiency of the switches. The identity of the switches which are closed in succession is provided in the column headings. An "X" in a memory cell means that a binary ONE is stored therein. The identity of the switch or set of switches which may be defective for an illustrated storage pattern is indicated to the right of the pattern.

Figure 2B:
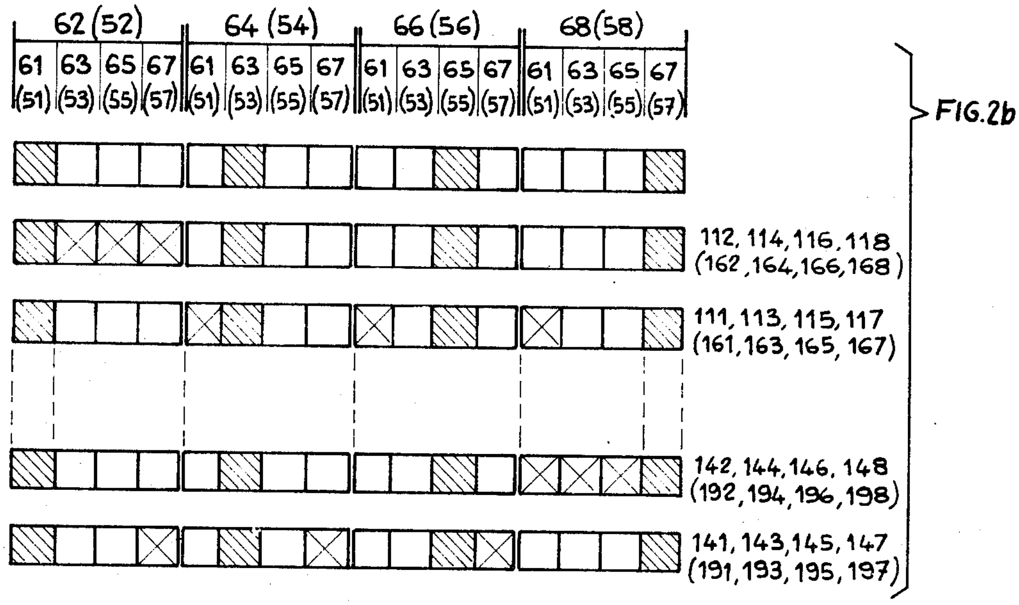

FIG. 2*b* shows the pattern of binary values stored in the RE register during each cycle which tests the efficiency of the diodes. Only patterns corresponding to the testing of diodes of the first and the fourth groups are shown. For each column, the unbracketed numerals indicate the corresponding pair of closed switches. The identity of the defective diode for an illustrated storage pattern is one of the groups indicated by the unbracketed numerals to the right of the pattern. The cross-hatched cells are those into which a binary ONE is always entered whether or not a diode is defective. A cell in which a binary ONE is entered due to a defective diode is denoted with an "X." It is evident that other successions of operations for sequentially closing all possible pairs of source and sink switches on the Y side may be chosen for this purpose.

As has been described, the unique identification of a faulty switch is possible in the arrangement of FIG. 1 only for Y side switches; i.e., for the side opposite to that which contains the diodes, and not for those on the X side. Better definition in locating a faulty switch may be obtained in the arrangement of FIG. 3, wherein each memory line is connected at both ends thereof to a pair of oppositely poled diodes.

Figure 3:
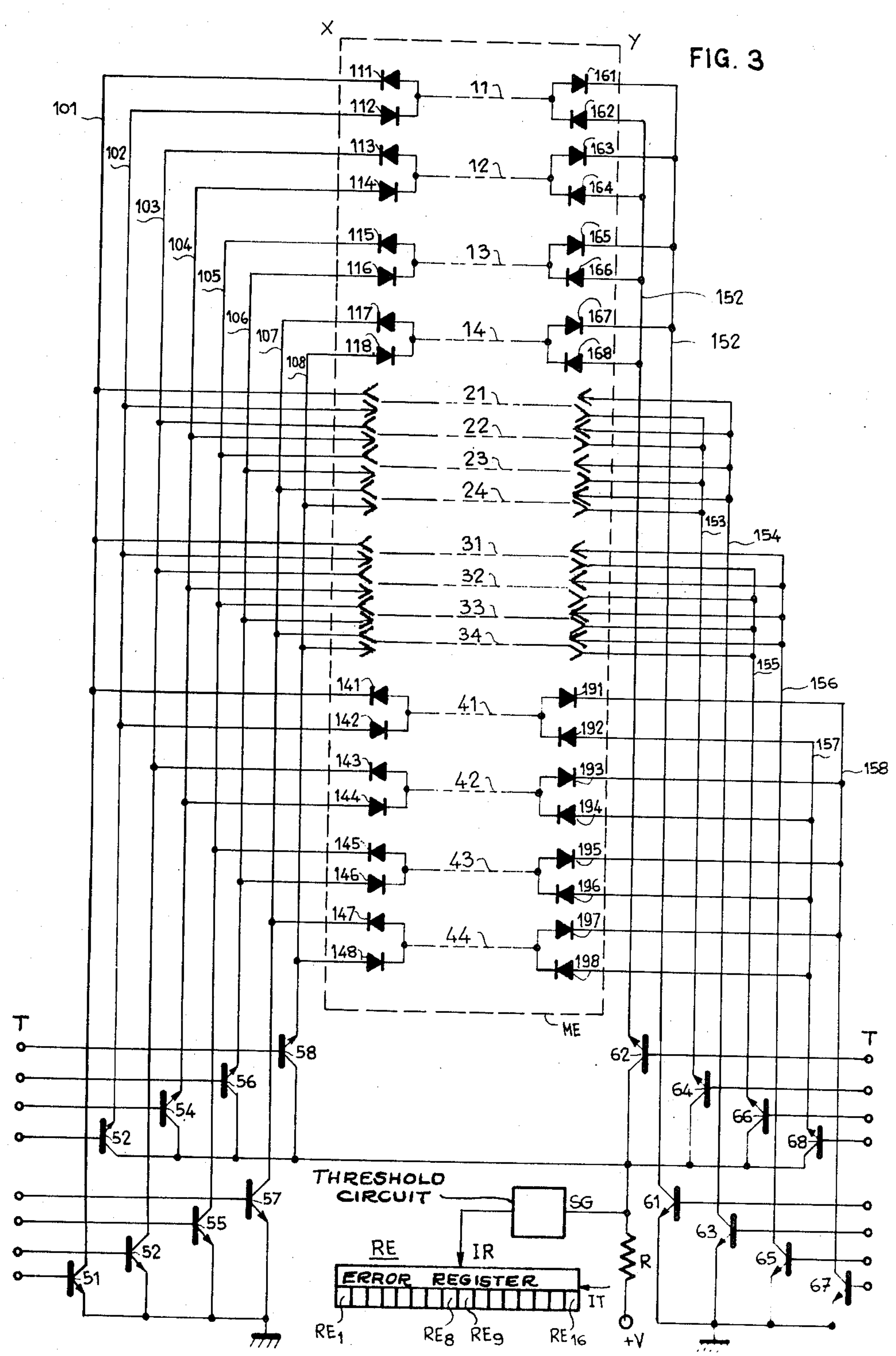
FIG. 3 is a schematic showing the lines of a dimension of selection of a memory matrix having four diodes per line, and illustrating an associated test circuit in accordance with the invention.

In FIG. 3 all components which appear in FIG. 1 are indicated by the same reference numbers. The eight diodes connected on the Y side to the first group of four lines 11 to 14 are designated by the respective reference numerals 161 to 168. The eight diodes connected on the Y side to the fourth group of four lines 41 to 44 are designated by the respective reference numerals 191 to 198. As in FIG. 1, the diodes connected to the lines of the second and third groups are not shown.

The test cycle for the arrangement of FIG. 3 comprises the same operations as described for that of FIG. 1. First, the closing of all source switches is inhibited and all sink switches are closed, one by one, in succession. Then the closing of all sink switches is inhibited and all source switches are closed, one by one, in succession.

If a defective source switch in the X side is permanently closed, for example switch 52, all first lines 11, 21, 31 and 41 of the FOUR line groups are continuously supplied from the voltage source, but not the other lines of these groups. Upon closing sink switches 51,53,55 and 57 in succession, current flows only when switch 51 is closed, whereas current flows in correspondence with the successive closure of each of sink switches 61,63,65 and 67. Correspondingly, a binary ONE will be stored in cell $RE_1$ and in cells $RE_5$ to $RE_8$.

If, instead, one of source switches 54,56 or 58 is permanently closed, voltage is supplied to only the respective second, third or fourth lines of each group so that upon closing in succession sink switches 51,53,55 and 57 and a binary ONE signal is delivered only as the respective one of switches 53,55 or 57 is closed. However, a binary ONE is delivered as each of switches 61, 63,65 and 67 is closed. Thus, a binary ONE will be stored in a respective one of cells $RE_2$, $RE_3$, or $RE_4$ and in all of cells $RE_5$ to $RE_8$.

If a sink switch is permanently closed on the X side, for example switch 51, only the first lines 11,21,31 and 41 of all line groups are grounded. Consequently, current will flow in correspondence with the closing of the single source switch 52 on the X side and of each of source switches 62,64,66 and 68 on the Y side. Therefore, a binary ONE will be stored in cell $RE_9$ and in all four cells $RE_{13}$ to $RE_{16}$. If, instead, one of sink switches 53, 55, or 57 is permanently closed, only the respective second, third or fourth lines of each group will be grounded, so that current flows only in correspondence wit the closing of the respective one of source switches 54,56 or 58. However, current flows as each of source switches 62, 64,66 and 68 is closed. Thus, a binary ONE will be stored in a respective one of cells $RE_{10}$, $RE_{11}$ or $RE_{12}$ and in all of cells $RE_{13}$ to $RE_{16}$.

In the instance that the faulty switch is on the Y side, the result of the test cycle will be the same as that described with reference to FIG. 1.

Figure 4:
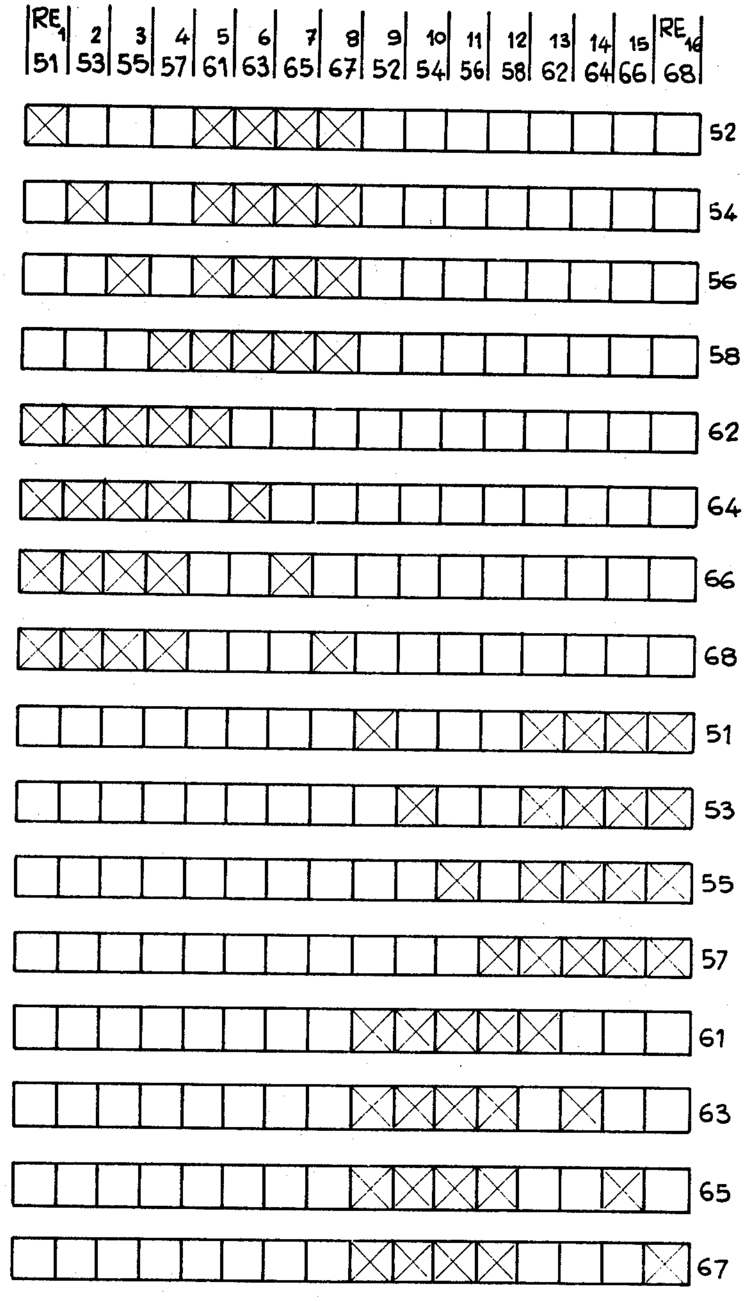
FIG. 4 shows the pattern of binary signals stored in the error register for a fault in a transistor.

FIG. 4 shows, on each line, the pattern of binary values stored in error register RE for each faulty switch.

As in FIG. 2a, each cell in which a binary ONE is stored is denoted by an "X."

If all switches are operating properly, the testing of the integrity of the diodes on the X side may proceed in the same manner and with the same results as described for the arrangement of FIG. 1. To test the diodes on the Y side a similar procedure is followed of inhibiting the closing of the switches on the Y side and of closing both switches of all possible pairs comprising a source switch and a sink switch on the X side. Inasmuch as the circuit arrangement is symmetrical, the test results are indicated in FIG. 2*b*, wherein the bracketed numerals represent diodes and transistors relating to the testing of diodes on the Y side.

Figure 5:
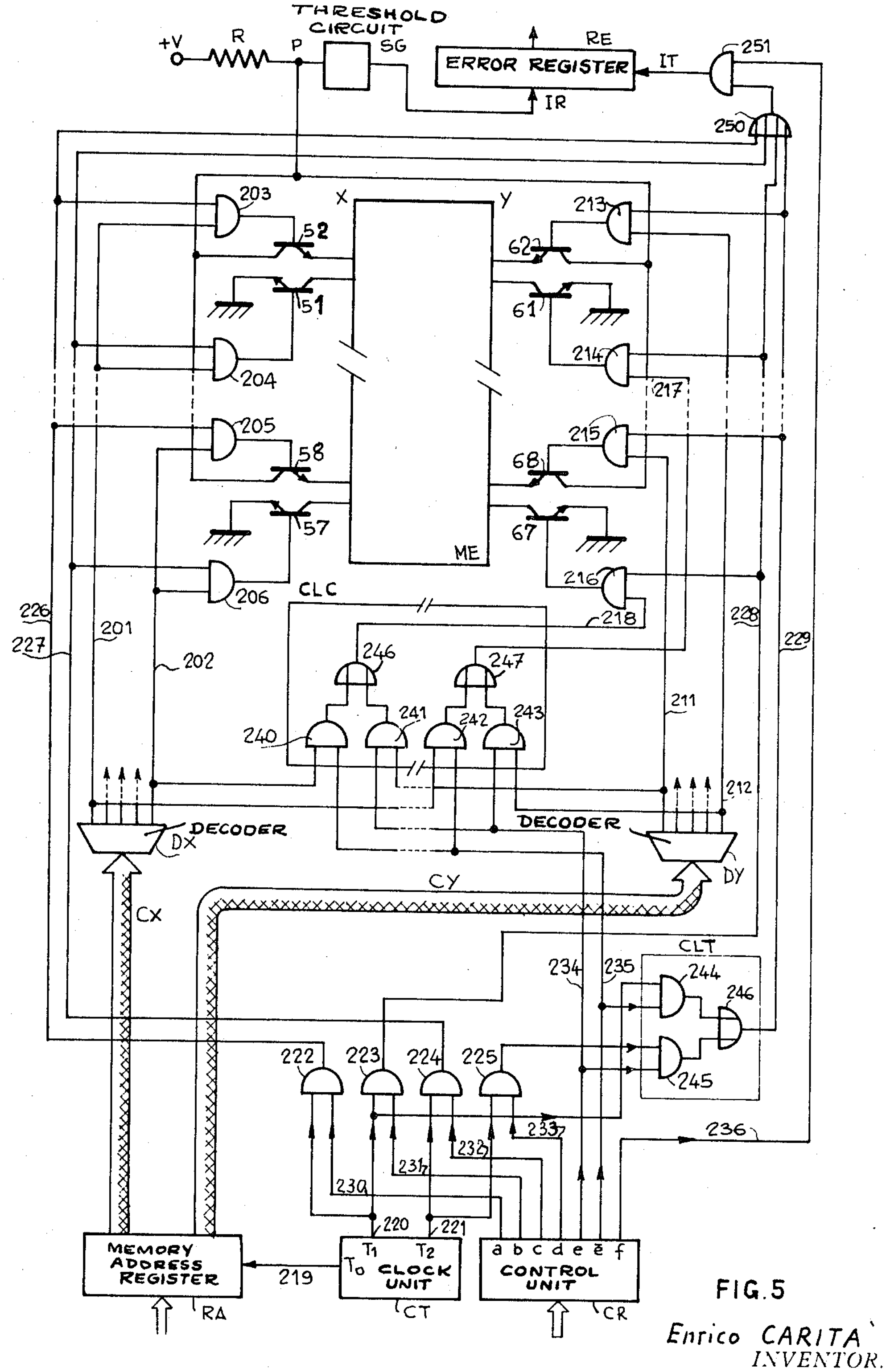
FIG. 5 is a block diagram of a selection and testing circuit for memory lines in accordance with the invention.

FIG. 5 is a block diagram, including a memory device, arranged in accordance with the invention. The disclosure of the memory device is limited to the lines of a single selection dimension. It is assumed that the memory is of the "destructive" type, wherein reading erases stored information, so that a memory cycle necessarily comprises a reading phase and a writing phase. It is further assumed that the arrangement corresponds to that of FIG. 1, i.e., a memory with two diodes per line.

The rectangle designated ME is assumed to comprise all memory lines and terminal diodes of the selection dimension being considered. Its contents, not shown in the drawing, comprises substantially that shown in the dashed rectangle designated ME in FIG. 1. The number of line groups and the number of lines per group may be different, usually being greater than the number four assumed for the memory of FIG. 1.

On the X and Y sides of the memory portion represented in rectangle ME only the first and last pair of source and sink switches are shown; i.e., switches 51 and 52; 57 and 58; 61 and 62; and 67 and 68. It is to be understood that between these first and last switch pairs are sufficient other pairs of switches for selecting a line from among the $N$ lines of the dimension being considered usually, these $N$ lines comprise $n$ groups of $m$ lines each, where $m \times n = N$. There are, therefore, $m$ pairs of switches on the X side, and n pairs of switches on Y side. For simplicity herein, it is assumed that $m = n$; i.e., $n^2 = N$. Accordingly, there are in all, $4n$ switches. However, all of the following description may be readily extended to the instance in which $m$ is different from $n$. The same reference numerals as used in FIG. 1 designate the voltage source +V, the limiting resistor R, the threshold circuit SG, the error register RE comprising $4n$ cells and the signal input lead IR and the clock pulse input lead IT to register RE.

In the lower part of FIG. 5 is shown a memory address register RA, which holds the address of the line to be selected in each memory cycle. For the assumptions made, register RA holds $2k = 2\log_2 n$ bits. The first half of the contents of register RA; i.e., the first $k$ bits, may be transferred, under control of a clock pulse $T_0$, through a channel CX to a decoder DX. The second half of the contents or register RA; i.e., the last $k$ bits, may be transferred through a channel CY to a decoder DY. Each of decoders DX and DY has n outputs leads, only the first output lead 201 and the last output lead 202 being shown for decoder DX. Similarly, only the first output lead 211 and the last output lead 212 are shown for decoder DY. For each address held in register RA, only one of the output leads of decoder DX will have the binary value ONE, the remaining output leads having the binary value ZERO. Similarly, only one output lead of decoder DY will deliver a binary ONE signal.

Also shown in FIG. 5 are a number of switching elements of the AND type, commonly called AND-gates, such as AND-gate 203. The AND-gates shown in FIG. 5 have two input leads. The output signal of these gates has the binary value ONE if, and only if, both input signals have the binary value ONE. These AND-gates will be called simply gates hereinafter and a gate will be said to be "open" if one of the input leads, chosen as the "control" lead receives a binary ONE signal. When a gate is open the signal on the second input lead appears unchanged on the output lead. The AND-gate is "closed" if the control input lead receives a binary ZERO. When a gate is closed the output signal is always a binary ZERO.

Switching circuits of the OR-type, also called OR-gates or simply OR, are also shown in FIG. 5. The OR-gates shown in FIG. 5 have two or more input leads, such as OR-gates 246 or 250. The output signal of an OR-gate has the binary value ONE if at least one of the input signals has the binary value ONE. The OR-gate may be considered as a constantly "open" gate, because a binary ONE signal on any one of the input leads is transferred to the output lead.

It may be assumed herein that the binary value ONE corresponds to a positive voltage, for instance 5 V, whereas the binary value ZERO corresponds to 0 volt.

The output lead 201 of decoder DX is connected to the control input lead of the AND-gates 203 and 204. The output signals of gates 203 and 204 control the respective bases of transistors 52 and 51, which comprise the respective source and sink switches for the first memory line of each group of lines.

A switch is closed and its transistor is conducting if a positive voltage; i.e. a binary ONE signal, is applied to the transistor base. All of the remaining output leads of decoder DX, such as output lead 202, are connected to the control input leads of AND-gates such as gates 205 and 206. The output signals of gates 205 and 206 control the bases of transistors 58 and 57, which comprise the source and sink switches for the last line of each group of lines. Inasmuch as all outputs of DX except one are binary ZERO's, all AND-gates on the X side will be closed, except for the pair of gates corresponding to the set of lines occupying the same position in all line groups which includes the line to be selected.

Output lead 212 of decoder DY is connected directly only to the control input lead of AND-gate 213. The output signal of gate 213 controls the base of transistor 62, which comprises the source switch for the first group of memory lines. The control input lead 217 of the AND-gate 214, whose output signal controls the base of transistor 61, the sink switch of the first group, is connected to the output lead of an OR-gate 247. OR-gate 247 is part of the logical switching unit CLC, which will be described hereinafter.

Similarly, all other output leads of decoder DY, such as output lead 211, are connected to the control input leads of corresponding AND-gates, such as gate 215. The output signals of these latter AND-gates control the source switches of the remaining line groups. The control input leads of gates such as gate 216, whose output signals control related sink switches, are connected to corresponding output leads of OR-gates, such as gate 246. These latter OR-gates also form part of logical unit CLC.

As will be explained in detail hereinafter on the Y side all AND-gates are closed, except for the pair of gates which control the source and sink switches corresponding to the line group which includes the line to be selected.

A clock unit CT delivers the clock pulses needed for the operation of the memory, including three clock pulses of appropriate duration and following in sequence which appear on output leads 219, 220 and 221, and which are designated respectively $T_0$, $T_1$ and $T_2$. The clock pulse $T_0$ on output lead 219 of the clock unit causes the insertion into address register RA of the address of the line to be selected. Clock pulses $T_1$ and $T_2$ on output leads 220 and 221 control respectively the reading and the writing operations.

Output lead 220 is connected to the second input lead of each of AND-gates 222 and 223. Output lead 221 is connected to the second input lead of each of gates 224 and 225. The output leads of AND-gates 222 and 224 are the respective clock leads 226 and 227 on the X side. Clock lead 226 is connected to the second input leads of a set of AND-gates which includes gates 203 and 205. Similarly, clock lead 227 is connected to the second input leads of a set of AND-gates which include gates 204 and 206.

The output lead of gate 223 is the clock lead 228, which is connected to the second input leads of, a set of AN-gates which include gates 214 and 216. These latter gates control the respective sink switches 61 and 67 on the Y side.

The output lead of AND-gate 225 is connected to the second input lead of an AND-gate 245, whose output lead is an input lead of an OR-gate 246. The output lead of gate 246 is the clock lead 229, which is connected to the second input leads of a set of AND-gates which include gates 213 and 215. These latter gates control respective source switches on the Y side. The remaining input lead of OR-gate 246 is the output lead of gate 244. The second input lead of gate 244 is connected to output lead 220 of the clock unit CT. AND-gates 244 and 245 and OR-gate 246 comprise the clock switching unit CLT.

A control unit CR may store a command code controlling the mode of operation. The operation mode may be either as normal mode, for normal memory operation, or one of the test modes for testing the switches and diodes. Control unit CR has seven output leads, the first four output leads 230 to 233 being connected to respective control input leads of gates 222 to 225. The binary variable signals *a*, *b*, *c*, and *d* are provided on these four output leads. A binary variable signal *e* and its binary complement signal $\bar{e}$ are provided on respective output leads 234 and 235. A binary variable signal *f* is provided on output lead 236.

Logical switching unit CLC comprises a number of switching circuits, each such switching circuit comprising two AND-gates whose output leads are connected to the input leads of an OR-gate. In FIG. 5 only the first and last of these switching circuits, which are assigned respectively to the first and last output leads of decoder DX and decoder DY, are shown.

The first switching circuit of switching unit CLC comprises AND-gates 242 and 243, whose second input leads are connected respectively to leads 201 and 212. The output leads of gates 242 and 243 comprise the input leads of OR gate 247, whose output lead is connected to the control input lead of AND-gate 214. Similarly in the last switching circuit shown the second input leads of AND gates 240 and 241 are connected respectively to output lead 202 of decoder DX and output lead 211 of decoder DY. The output lead of OR-gate 246 is connected to the control input lead 218 of AND-gate 216.

The control input leads of gates such as gates 241 and 243 of logical switching unit CLC, as well as the control input lead of gate 245 of clock switching unit CLT are connected to output lead 234 of control unit CR, thereby receiving the binary variable signal *e*. The control input leads of gates such as gates 240 and 242 of logical switching unit CLC, as well as the control input lead of gate 244 of clock switching unit CLT are connected to output lead 235 of control unit CR, thereby receiving the complementary variable signal $\bar{e}$.

Output lead 236 of control unit CR, supplying the variable signal *f*, is connected to the control input lead of a gate 251. The output lead of gate 251 is connected to the clock input lead IT of register RE. The second input lead of gate 251 is connected to the output lead of OR-gate 250, whose four input leads are connected to respective ones of clock leads 226, 227, 228 and 229.

The operating mode of the memory circuit depends on the pattern of the set of binary variables *a*, *b*, *c*, *d*, $\bar{e}$ and *f*. The possible modes include the normal operating mode and the different diagnostic modes for checking the source switches, the sink switches and the diodes.

In the normal mode of operation the pattern of the control binary variables is:

| a | b | c | d | e | $\bar{e}$ | f |
|---|---|---|---|---|---|---|
| 1 | 1 | 1 | 1 | 1 | 0 | 0 |

Accordingly, gates 222, 223, 224, 225 and 245 are open. The clock pulse $T_1$ is transmitted to both clock leads 226 and 228. Clock pulse $T_2$ is transmitted through gate 224 to clock lead 227 and through gates 225, 245, and OR-gate 246 to clock lead 229. Gate 244 is closed.

Assuming, for example, that the line to be selected is the first line of the first group, decoder DX will deliver a binary ONE on output lead 201, thereby opening gate 203. Decoder DY will deliver a binary ONE on output lead 212. Because $e = 1$ and $\bar{e} = 0$, gate 243 of the logical switching unit CLC is open and gate 242 is closed. Therefore, the binary ONE on output lead 212 is transmitted through AND-gate 243 and OR-gate 247 to the control input 217 of gate 214, opening gate 214. Thus the pulse $T_1$ is transmitted through open gates 222 and 203 to the base of transistor 52, and through open gates 223 and 214 to the base of transistor 61. Both transistors 52 and 61 become conductive, enabling a read current pulse to flow through the path comprising: the source +V, resistor R, transistor 52, the first line of the first group, transistor 61, and ground. Immediately thereafter, pulse $T_2$ is transmitted through open gates 224 and 204 to the base of transistor 51, and through open gates 225, 245, 246 and 213, to the base of transistor 62. Both transistors 51 and 62 become conductive, enabling a write current pulse to flow through the selected line in the reverse direction. In both instances, these reading and writing pulses cause threshold unit SG to deliver binary ONE error signals to the input lead IR of register RE. However, since the control input lead of gate 251 is receiving a binary ZERO, $f = 0$, clock pulses do not reach the clock input lead IT of register RE. Therefore, the input signal to register RE is not stepped along and the binary ONE signals delivered by circuit SG are not stored.

Subsequent addresses stored during subsequent memory cycles in register RA provide for sending write and read pulses through correspondingly selected memory lines.

In order to check the sink switches it is necessary to close all source switches one at a time, in succession, first on the X side and then on the Y side, all other switches being open. To perform this operation for the X side, the pattern of the control binary variables is:

| a | b | c | d | e | $\bar{e}$ | f |
|---|---|---|---|---|---|---|
| 1 | 0 | 0 | 0 | 1 | 0 | 1 |

Accordingly, gate 222 is open, and clock pulses $T_1$ are transmitted to clock lead 226. Gates 223 to 225 are closed, and therefore no clock pulse is transmitted to clock leads 227,228 and 229. A suitable diagnostical program provides for entering in succession into register RA a sequence of addresses such that a binary ONE signal is delivered in succession on all output leads of decoder DX. Thus, all gates, such as gates 203 and 205, which control the source switches on side X are opened one at a time, in succession. The signals delivered by decoder DY are irrelevant, since no clock pulses are transmitted on the clock leads on the Y side. Furthermore, since no clock pulse is provided on clock lead 227, which is associated with the sink switches on the X side, all sink switches on the X side, as well as all sink and source switches on the Y side, remain open.

Because $f = 1$, gate 251 is open, permitting the clock pulses $T_1$, transmitted on clock lead 226 and through OR-gate 250, to reach clock pulse input lead IT of register RE. Therefore, the input signal to register RE is stepped along to store the signals delivered by circuit SG in cells $RE_1$ to $RE_n$.

To next close all source switches on the Y side, the pattern of the control binary variables is:

$a\ b\ c\ d\ e\ \bar{e}\ f$ 0 0 0 1 1 0 1

Accordingly, gate 222 is closed and gate 225 is open. Clock pulses $T_2$ reach clock lead 229 through gates 225, 245 and 246. The address register RA then receives addresses such that a binary ONE signal is delivered in succession on all output leads of decoder DY. The signals delivered by decoder DX are irrelevant. Therefore, all source switches on the Y side are closed one at a time, in succession, all other switches remaining open. The clock pulses $T_2$ reach clock pulse input lead IT of register RE, which steps along the register input signal, storing the error signals in cells $RE_{n+1}$ to $RE_{2n}$.

By repeating the same addressing sequence for each of the following patterns of control binary variables:

$a\ b\ c\ d\ e\ \bar{e}\ f$ 0 0 1 0 1 0 1

0 1 0 0 1 0 1 the sink switches are closed one at a time, in succession, first on the X side by means of pulses $T_2$ transmitted through open gate 224, and then on the Y side by means of pulses $T_1$ transmitted through open gate 223. Because $e = 1$, the output signals of decoder DY reach the control input leads of respective gates such as gates 214 and 216 through open gates including gates 241 and 243 and OR-gates including gates 246 and 247. The error signals generated by circuit SG are stored in cells $RE_{2n+1}$ to $RE_{4n}$.

In order to test the diodes on the X side it is necessary to close simultaneously a source switch and a sink switch on the Y side, for all possible pairs of sink and source switches. The corresponding pattern of the control binary variables is:

$a\ b\ c\ d\ e\ \bar{e}\ f$ 0 1 0 0 0 1 1

Accordingly, gates 222, 224 and 225 are closed and gate 223 is open. The clock pulse $T_1$ is transmitted on clock lead 228. Because $e = 0$ and $\bar{e} = 1$, gate 244 is open and gate 245 is closed. Therefore, pulse $T_1$ is transmitted through gates 244 and 246 to clock lead 229.

The address register receives a succession of addresses, one for each memory cycle, such that a binary ONE is delivered on a single output lead of decoder DY for all possible pairs of output signals of decoder DX and decoder DY. This is equivalent to a program for selecting in succession all of the memory lines.

Because $e = 0$ and $\bar{e} = 1$, the gates including gates 240 and 242 of unit CLC are open and the gates including gates 241 and 243 are closed.

The binary ONE signals delivered in succession by decoder DY open in succesion the gates, including gates 213 and 215, which control the source switches on the Y side. The binary ONE signals delivered in succession by decoder DX open in succession, through the gates including gates 240 and 246 and gates 242 and 247, the gates, including gates 214 and 218, which control the sink switches on the Y side. During each memory cycle, a clock pulse $T_1$ closes a pair of switches comprising a sink switch and a source switch. By closing all possible pairs of sink and source switches on a side the testing of the diodes on the opposite side is accomplished.

The clock pulses $T_1$, transmitted through gates 250 and 251, control the stepping of error register RE and the storage of error signals in the appropriate memory cells. For testing the arrangement of FIG. 3, wherein all memory lines are provided with a pair of diodes at each end, a second symmetrical CLC logical switching unit, not shown, in FIG. 5, is provided. This second logical switching unit is symmetrically connected relative to the first CLC unit. Suitable control is provided for testing the diodes on both the X side and the Y side, employing a device which activates either one of the two logical switching units CLC. Similarly a symmetrical and symmetrically connected clock switching unit CLT is provided, along with means for activating either one of the two units CLT. It is thereby possible to inhibit the closing of all switches on the Y side and control the simultaneous closing of both switches of all pairs of switches comprising a sink switch and a source switch on the X side.

The error register RE may be replaced by a single flip-flop for recording whether an error signal has been generated by the SG circuit during a memory cycle. In this instance, after each memory cycle the contents of the flip-flop is read out and stored in an external memory of sufficient capacity, together with the address in the address register. Such external memory may be either a magnetic disk or tape store.

Because, in most cases $n$ is greater than 4, an error register RE containing $4n$ cells, while adequate for testing the switches, is not adequate for the diodes. For testing the diodes $n^2$ cells are required, $n^2$ being the number of the all possible switch pairs comprising a sink and a source switch. For an error register with only $4n$ cells, it is necessary to carry on the testing of the diodes in subsequent steps, transferring the contents of register RE at the end of each step to a file memory, together with an indication of the address corresponding to each error signal.

I claim:

1. Apparatus for detecting and locating faults in the selection circuits of an addressable memory, wherein said memory comprises a plurality of selection lines and wherein each of said lines has a current transmitting switch coupled to one end thereof and a current receiving switch coupled to the other end thereof, comprising in combination: selection means for closing in succession individual ones of a group of said switches, threshold means for sensing the current flowing through said switches and for delivering an output signal whenever the quantity of said current exceeds a predetermined value, and storage means coupled for receiving and storing a representation of each output signal delivered by said threshold means.

2. The apparatus of claim 1 wherein said storage means comprises a plurality of storage cells, and wherein a respective different one of said cells is coupled to receive the signal delivered by said threshold means in correspondence with said closing of each of said switches.

3. Apparatus for detecting and locating faults in the selection circuits of an addressable memory, wherein said memory comprises a plurality of selection lines, wherein groups of the first ends of said lines are connected to respective first common connection points and sets of the second ends of said lines are connected through unidirectional elements to respective second common connection points, and wherein a current transmitting switch and a current receiving switch are coupled to each of said connection points, comprising in combination: selection means for closing in succession both switches of each different pair of switches comprising a current transmitting switch and a current receiving switch coupled to said first common connection points, threshold means for sensing the current flowing through said switches and for delivering an output signal whenever the quantity of said current exceeds a predetermined value, and storage means coupled for receiving and storing a representation of each output signal delivered by said threshold means.

A method for detecting and locating faults in the selection circuits of an addressable memory, wherein said memory comprises a plurality of selection lines, wherein each of said lines has at least one current transmitting switch and at least one current receiving switch coupled thereto, and wherein an address register is adapted to store an address of a respective one of said lines, comprising the steps of: entering the address of each of said lines in succession into said address register, closing at least one of the switches coupled to the line identified in said address register, sensing the current flowing through said switches and delivering an output signal whenever the quantity of said current exceeds a predetermined value, and entering into a store a representation of each output signal delivered by said threshold means.

5. The method of claim 4 further including the step of identifying and locating a fault in said selection circuits by inspection of said representations in said store.

6. The method of claim 4 wherein said step of closing at least one of said switches comprises closing one current transmitting switch and one current receiving switch coupled to the line identified in said address register.

7. In a memory device comprising a plurality of selection lines and wherein each of said lines has a current transmitting switch coupled to one end thereof and a current receiving switch coupled to the other end thereof, the improvement comprising; selection means for closing in succession individual ones of a group of said switches, and threshold means for sensing the current flowing through said switches and for delivering an error signal whenever the quantity of said current exceeds a predetermined value.

8. The memory device of claim 7, further comprising an error register for receiving and storing said error signals.

9. In a memory device comprising a plurality of selection lines wherein groups of the first ends of said lines are connected to respective first common connection points and sets of the second ends of said lines are connected through unidirectional elements to respective second common connection points, and wherein a current transmitting switch and a current receiving switch are coupled to each of said connection points, the improvement comprising selection means for closing in succession both switches of each different pair of switches comprising a current transmitting switch and a to receiving switch coupled to said first common connection points, and threshold means for sensing the current flowing through said switches and for delivering an error signal whenever the quantity of said current exceeds a predetermined value.

10. The memory device of claim 9, further comprising an error register for receiving and storing said error signals.

* * * * *